A., CALLESON.
MACHINE FOR OPERATING ON TUBULAR ARTICLES.
APPLICATION FILED JAN. 23, 1917.
1,289,388.
Patented Dec. 31, 1918.
8 SHEETS—SHEET 1.
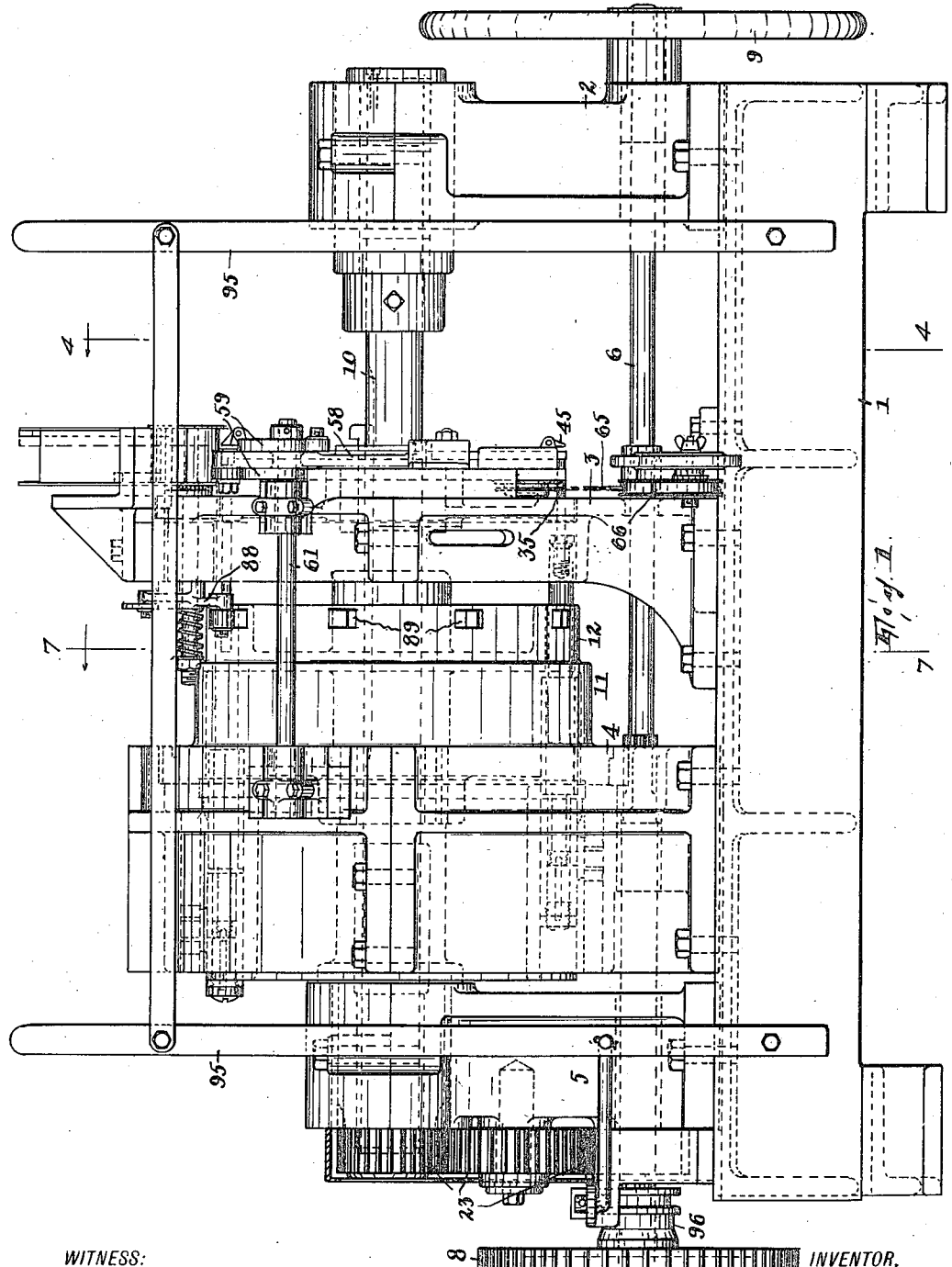

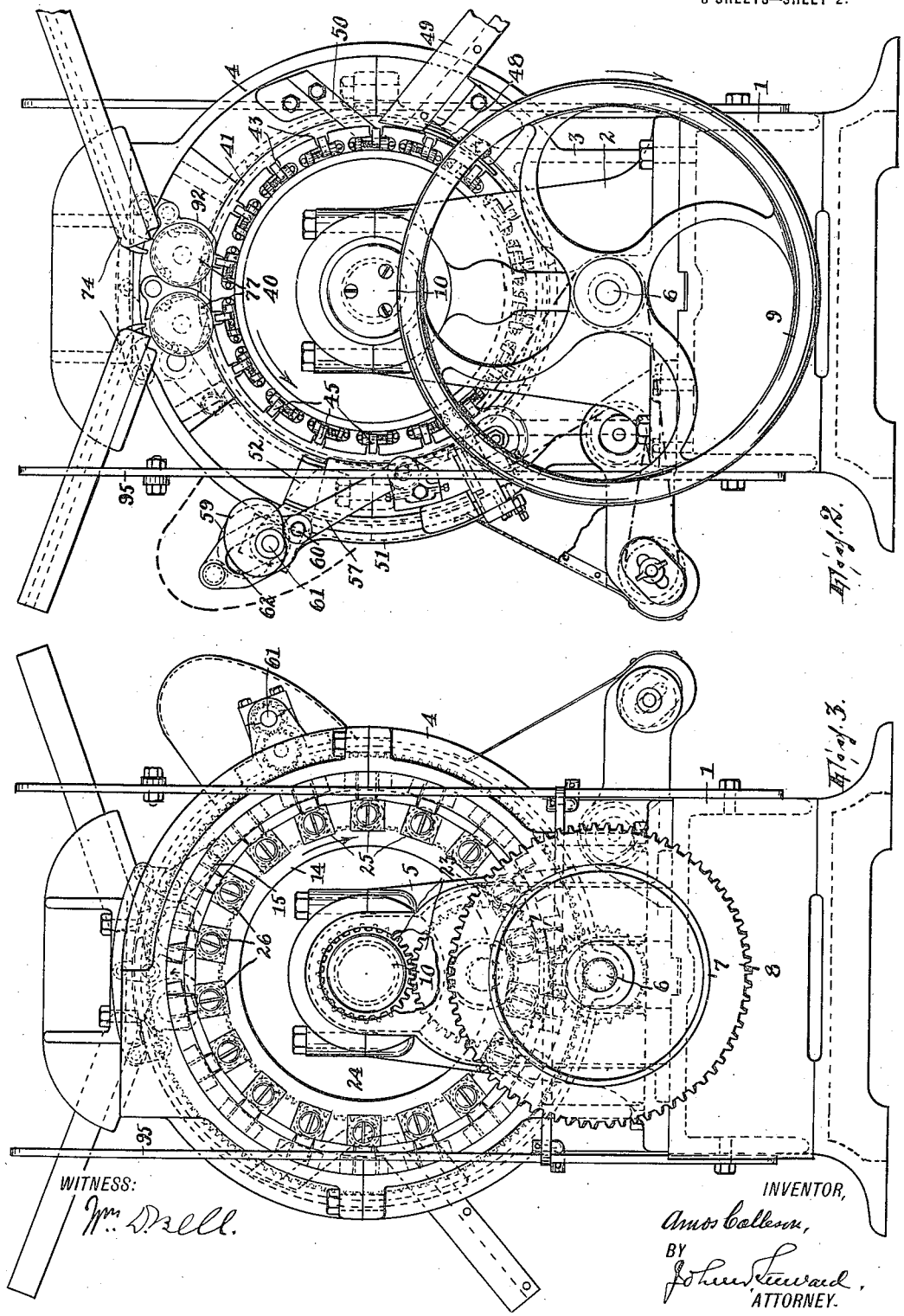

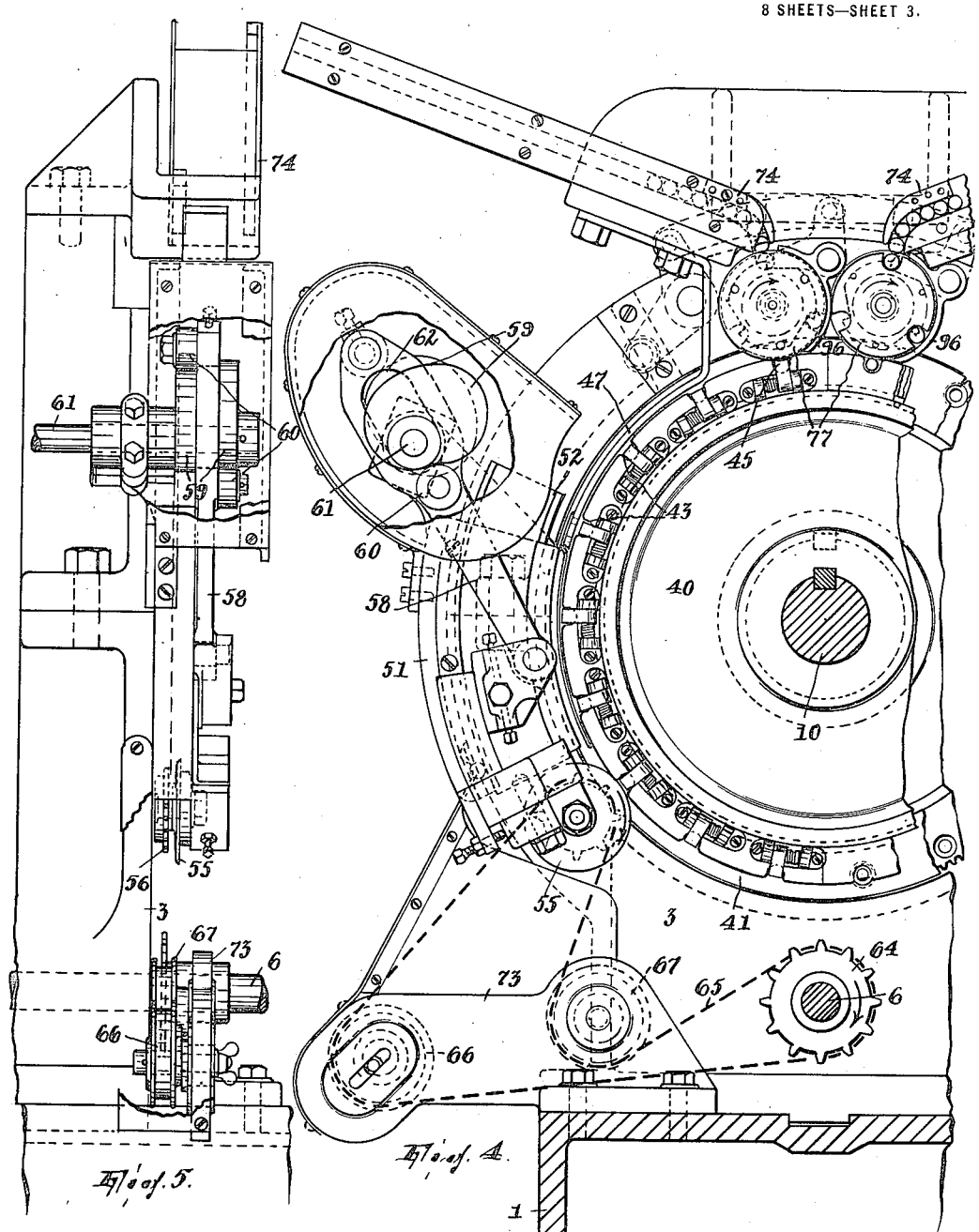

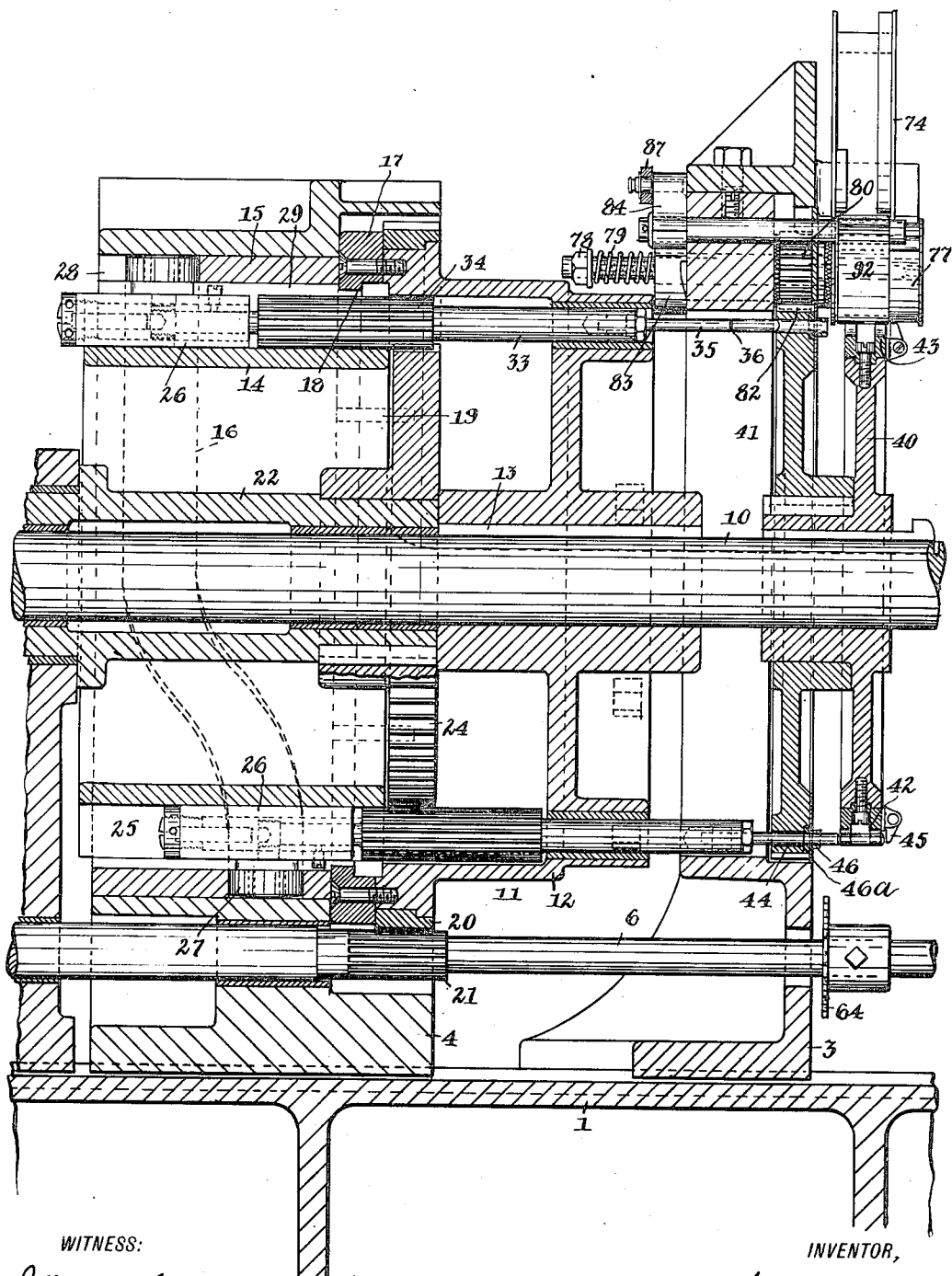

A. CALLESON.
MACHINE FOR OPERATING ON TUBULAR ARTICLES.
APPLICATION FILED JAN. 23, 1917.
1,289,388.
Patented Dec. 31, 1918.
8 SHEETS—SHEET 5.
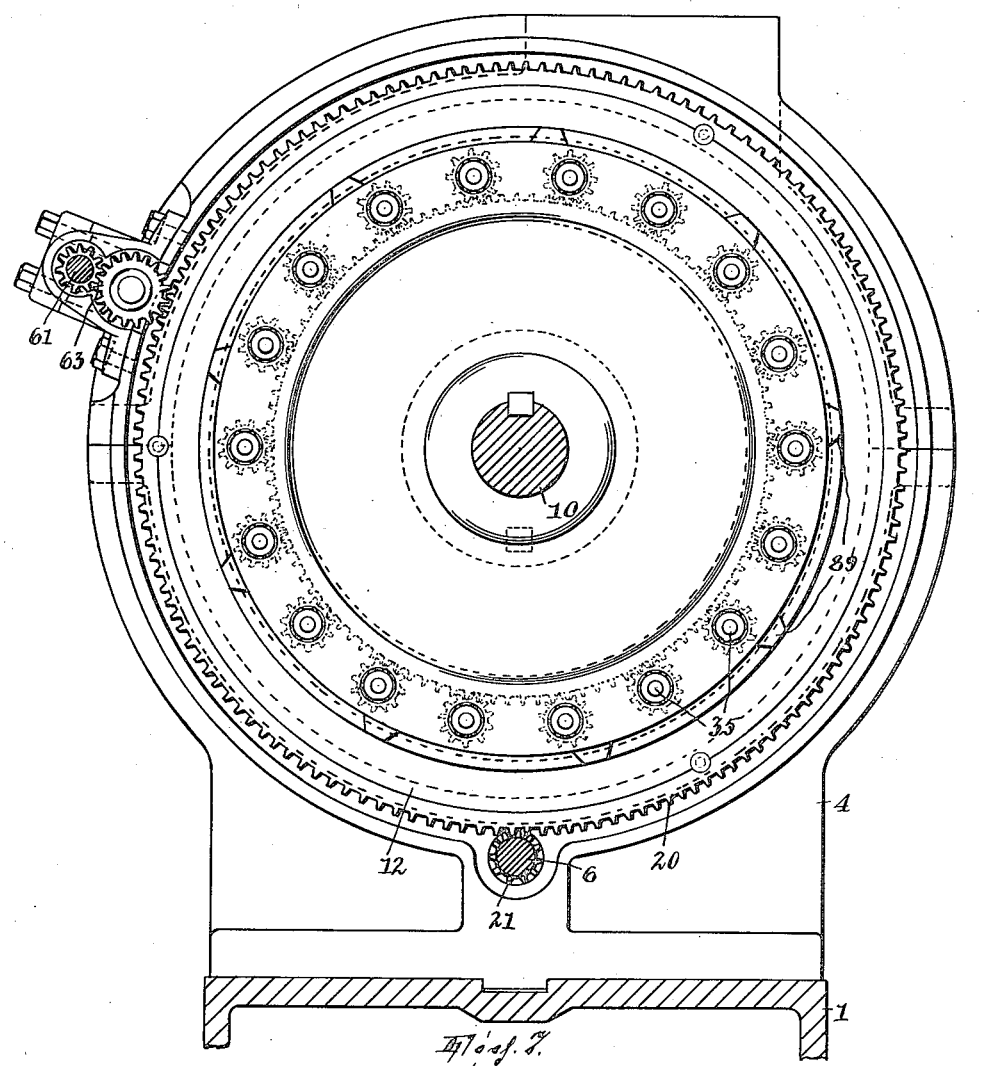
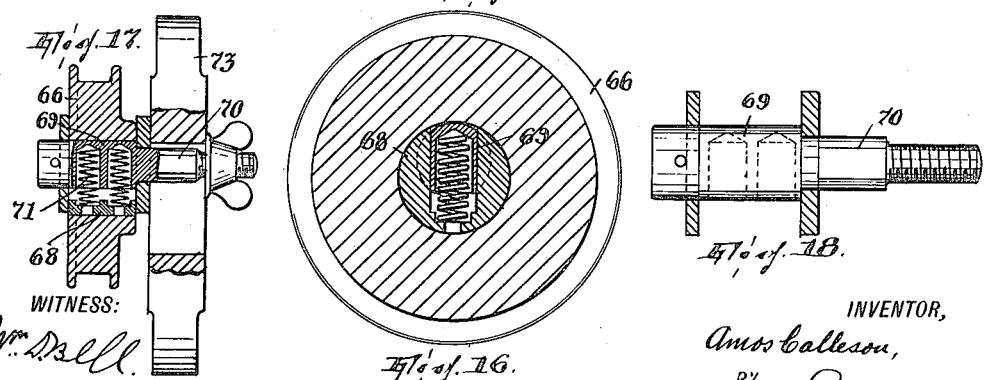

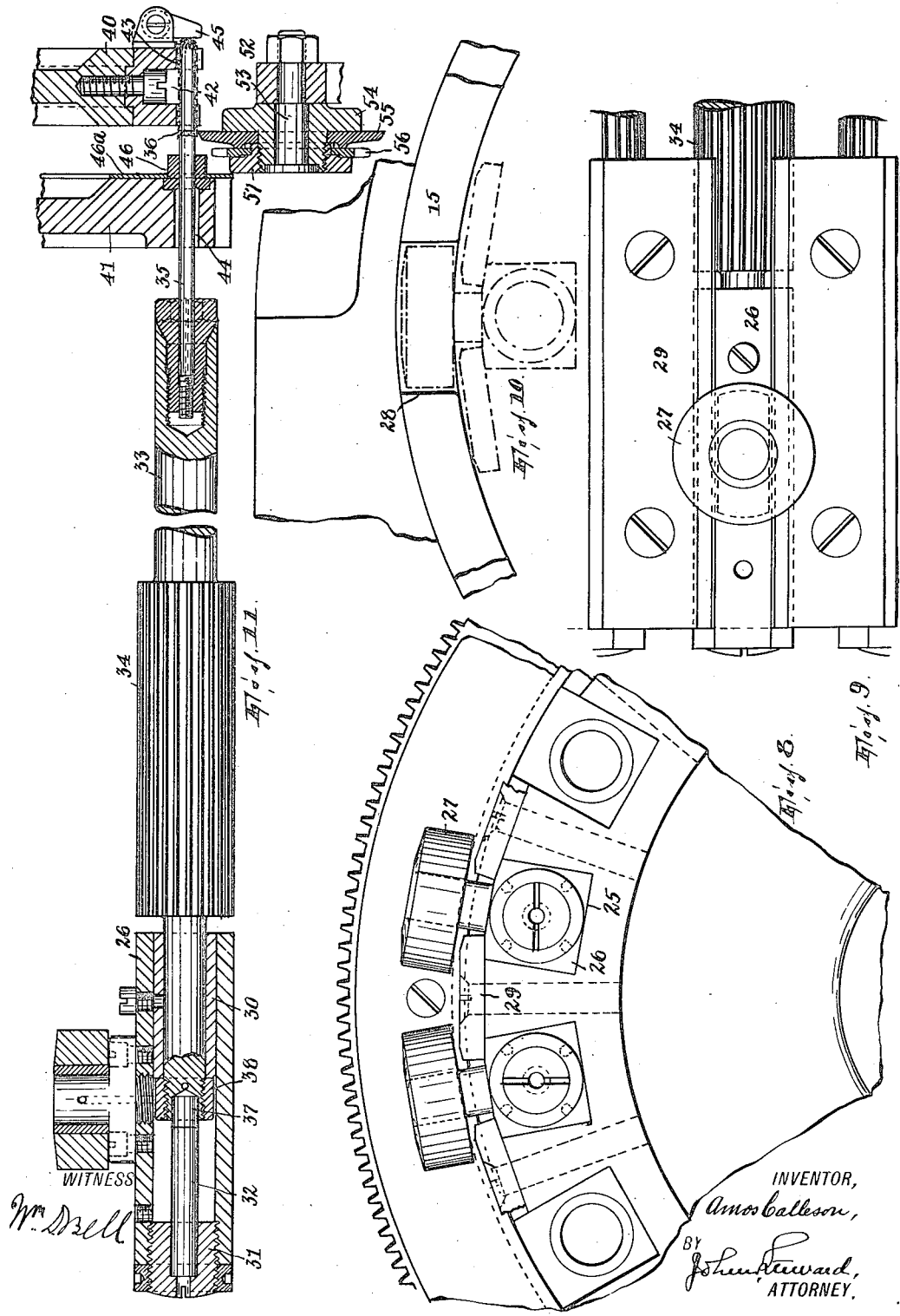

A. CALLESON.
MACHINE FOR OPERATING ON TUBULAR ARTICLES.
APPLICATION FILED JAN. 23, 1917.
1,289,388.
Patented Dec. 31, 1918.
8 SHEETS—SHEET 7.
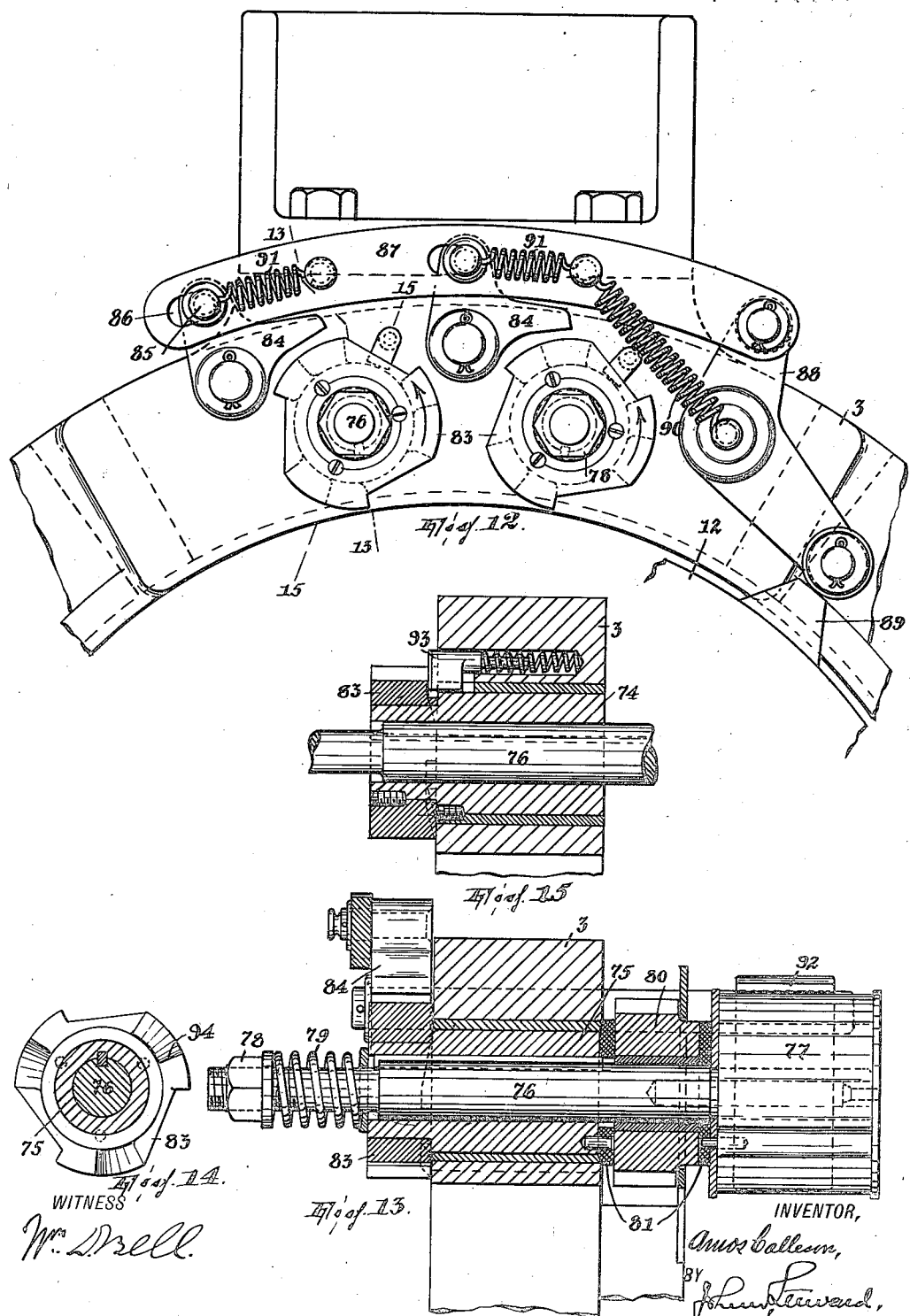

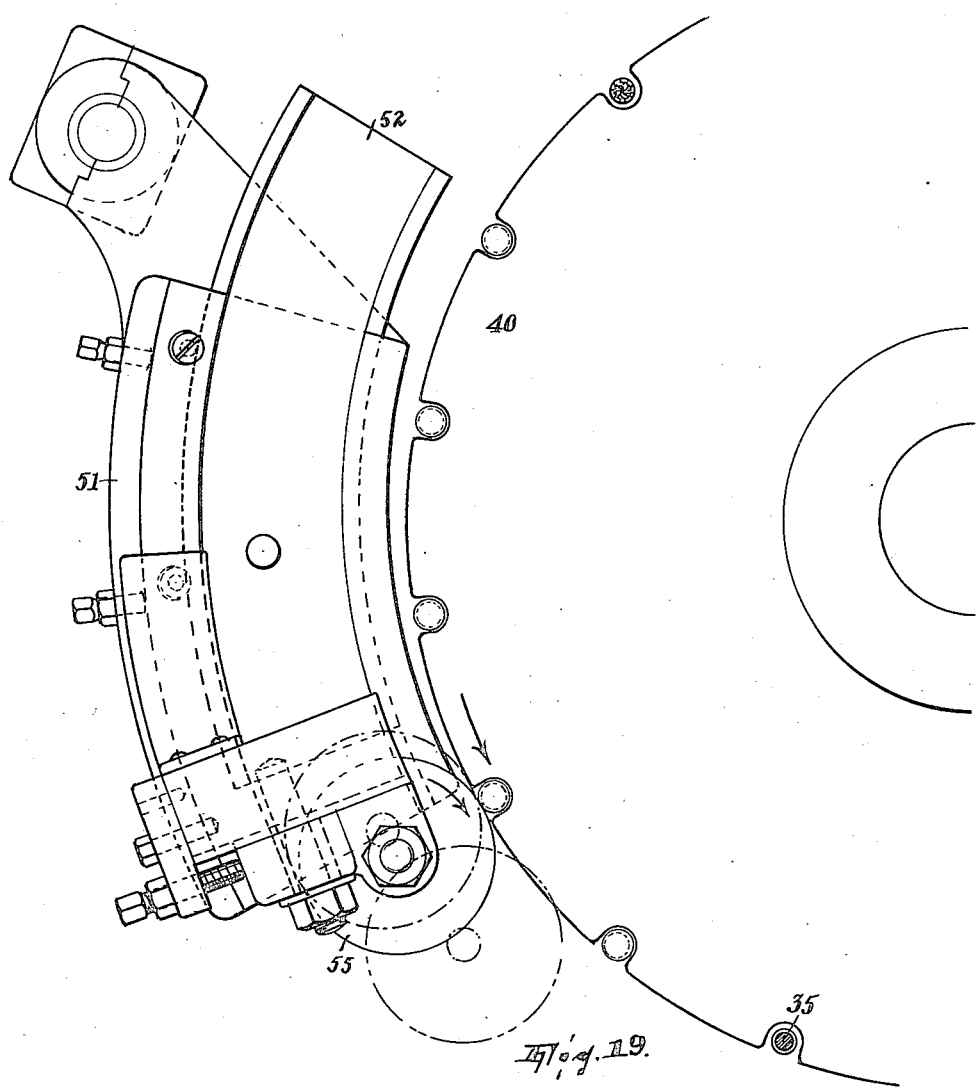

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

MACHINE FOR OPERATING ON TUBULAR ARTICLES.

1,289,388.

Specification of Letters Patent.

Patented Dec. 31, 1918.

Application filed January 23, 1917. Serial No. 143,945.

*To all whom it may concern:*

Be it known that I, AMOS CALLESON, a citizen of the United States, residing at Brooklyn, in the county of Kings and State of New York, have invented certain new and useful Improvements in Machines for Operating on Tubular Articles, of which the following is a specification.

This invention relates to means for cutting or trimming off tubular articles, especially metal articles, such as the tubular capsules from which cartridge shells are formed, in which case after the shells have been drawn from slugs it is usually necessary to trim off their free and more or less irregular edges in order to finish them. The machine herein shown and described has been designed with particular reference to turning out as large a quantity of product in a given time as is consistent with good work, to performing the operation on the articles so that they will be uniformly finished and have the machine automatically reject those that are improperly faced or so badly mutilated before they come to the machine that they cannot undergo its operation without perhaps causing a jam therein.

The invention will be found fully illustrated in the accompanying drawings, wherein, Figure 1 is a side elevation of the machine, and Figs. 2 and 3 front and rear elevations, respectively;

Fig. 4 is a vertical transverse sectional view, looking toward the left in Fig. 1, taken in a vertical plane on the line 4—4 in said figure;

Fig. 5 is a side elevation of the parts seen in Fig. 4;

Fig. 6 is a longitudinal vertical central sectional view of the main part of the machine;

Fig. 7 is a vertical transverse sectional view taken in a plane on the line 7—7 and looking toward the left in Fig. 1;

Fig. 8 is a fragmentary rear elevation of the rotary turret and slides therein;

Fig. 9 is a fragmentary plan of the rear turret section, showing one of the slides;

Fig. 10 is a rear elevation of what is shown in Fig. 9, the slide appearing in dotted outlines;

Fig. 11 shows, partly in side elevation and partly in longitudinal section the train of elements directly involved in holding, rotating and trimming or cutting a shell;

Fig. 12 is a rear elevation of the upper part of the standard 3 and the means thereon for transferring the shells, two at a time, from the shell runways to the shell carrier;

Fig. 13 is a sectional view of said means on line 13—13, Fig. 12;

Fig. 14 is a transverse section of a part of said means, looking rearwardly;

Fig. 15 is a sectional view on line 15—15, Fig. 12;

Fig. 16 is a transverse sectional view through a certain pulley 66 and its axial support;

Fig. 17 is a view showing the same pulley in longitudinal section and the axial support therefor and the bracket carrying the same partly in elevation and partly in section;

Fig. 18 is a side elevation of said axial support; and,

Fig. 19 shows the relation of the paths of travel of the cutter and shells being operated upon.

There is a base 1 on which are arranged four alined standards 2, 3, 4 and 5. Standards 3 and 4 are circular in end elevation, and each is preferably made in two sections, upper and lower, as shown, bolted together. The other two standards afford ordinary bearings, as will appear.

Standards 2, 4 and 5 afford bearings for a horizontal drive shaft 6. At one end this shaft carries a pulley 7 and a gear 8 whereby, either through a belt or a motor, the shaft may be power-driven; at its other end it carries a wheel 9 whereby it may be turned by hand. Parallel with and above shaft 6 it a shaft 10 journaled in standards 2 and 5.

A turret or mandrel carrier 11 formed in two sections is arranged to rotate with shaft 10. The forward section 12 is keyed to the shaft at 13 and the rear section 14 is housed within the circular opening of the standard 4, being in fact journaled in a barrel cam 15 which is fitted into and suitably fixed in said opening, its camway being indicated at 16; the turret section 14 is kept up to the turret section 12 (bound to shaft 10 against longitudinal movement thereon by the key 13) by a ring 17 secured to the turret section 12, the ring and turret section 14 having a suitable flange-interlock at 18, and the turret sections are interlocked for rotation together by the dowels 19. The turret is driven through a gear 20 on turret section 12 and a pinion 21 on shaft 6.

Journaled in the standard 5 is a sleeve 22 which at its rear end is connected by gearing 23 (Fig. 1) with the shaft 6 and at its forward end carries a gear 24 keyed thereon; the structure 22—24 may afford bearings, intermediate the bearings in standards 2 and 5, for shaft 10, and it is confined against endwise movement by the turret section 12 and standard 5.

In the periphery of the turret section 14 are arranged at equal intervals a series of slots 25 parallel with its axis of rotation. In each slot is arranged a slide 26 equipped with a roller 27 which runs in the camway 16 (and may be admitted thereto on assembling through an opening 28—Figs. 6 and 10). The slides are confined in the slots 25 by the plates 29 (Figs. 8 and 9). Each slide contains a bushing 30 at its forward end and an adjusting screw 31 screwed into its rear end, the latter carrying an axial thrust pin 32. It will be obvious that when the turret rotates, the slides, due to the camway 16 will reciprocate parallel with shaft 10 as they travel around with the turret. Each slide controls a rotary mandrel as follows:

The mandrel includes a chuck 33, having an elongated pinion 34 formed thereon, and a spindle-like tool 35 or mandrel proper removably held axially therein and having its free end rounded and preferably scored or knurled and a suitable distance back from its free end a shearing shoulder 36 formed by circumferentially grooving the tool; the rear end of the mandrel is journaled in the bushing 30 of the slide 26 and contains a hardened stud 37 to bear against the thrust pin 32, and also a nut 38 screwed thereon. By adjusting the screw 31 and nut 38 the wear can be taken up and the mandrel advanced or set back longitudinally of its axis. The mandrel has its pinion 34 meshing with the gear 24, and forward of its pinion it is preferably journaled in the turret section 12 (Fig. 6). In view of the foregoing it will be apparent that when shaft 6 is driven a planetary movement will occur as between the gear 24 and the mandrels, which are rotated on their own axes as they travel around with the turret. During such movement, the mandrels receive longitudinal back and forth movement, as described, being retracted for approximately the upper half and advanced for approximately the lower half of the cycle of movement of the turret.

Forward of the turret and partly housed in the standard 3 is a carrier for the shells or other articles being operated upon. It includes a carrier disk 40 keyed to the shaft and a stripper disk 41 keyed on the hub of the disk 40 back of the latter. The periphery of the disk 40 is circumferentially grooved, as at 42, and has a series of pockets 43 axially alined with the several mandrels, the tools 35 of which extend through holes 44 in the disk 41 and reciprocate into and out of said pockets (see Fig. 6). A spring pawl 45 is arranged at the forward end of each pocket. The disk 41 has, axially alined with each pocket, a stripper 46 adapted to be penetrated by the tool 35. These strippers are removably held to the disk 41, so that others of different length may be substituted, by the circular plate 46ª, (Fig. 11).

The shells are fed to the pockets so as to rest horizontally therein by suitable means (to be described) above the carrier and until they are telescoped by the tools 35 they are retained against being jarred out of the pockets by a guard 47 (Fig. 4); a similar guard 48 is shown in Fig. 2 to retain the shells in the pockets after the tools are withdrawn from them and before they reach the chute 49 by which they are delivered from the machine, 50 being a deflector which enters the groove 42 in the disk 40 to insure such delivery. Each pocket virtually has as its rearward limit the stripper 46, and as its forward limit the yielding stop 45. After each shell has been deposited in its pocket the corresponding mandrel is advanced and its rotating tool caused to telescope and thereupon (because the end of the tool is knurled or scored) rotate the shell in the pocket while it is carried around with the shell carrier a certain distance, being at that time operated upon to trim it off as will be described; subsequently the tool is withdrawn so that the shell can be delivered to the chute 49. When the tool withdraws, the shell is prevented from receding with it by the stripper 46, the cut-off ring of metal falling away and the trimmed shell remaining in the pocket, retained by the guard 48. If a shell should be deposited in its pocket with its butt or closed end rearward, or if its open end should be badly mutilated so that the tool 35 could not telescope the shell, when the tool advances it will push the shell forward out of the pocket, pawl 45 yielding.

The cutting or trimming is performed by a rotary cutter which preferably reciprocates in a path that converges toward the circular path of travel of the shell in the carrier pockets. A guide 51 is bolted to the front of the standard 3 so that its curved guideway converges with respect to any arc concentric to shaft 10 (Figs. 4 and 19). 52 is a slide arranged to reciprocate in said guide. On a stud 53 secured in this slide is journaled a cutter holder 54 which has a cutter 55 and a sprocket wheel 56 clamped thereon by means of a nut 57 (Fig. 11).

The cutter slide 52 is reciprocated through a pitman 58 (Figs. 1, 2, 4 and 5) from cams 59 which operate in reverse directions on rolls 60 on opposite sides of the pitman, said cams being carried by a horizontal shaft 61 (penetrating a longitudinal slot 62 in the pitman) journaled in suitable bearings on the standards 3 and 4 and rotated by gearing 63 (Fig. 7) from the gear 20. The cutter is rotated from a sprocket wheel 64 on the shaft 6 through a chain 65 extending around sprocket wheel 56 and suitable idler pulleys 66 and 67. On account of the reciprocation of the slide, one of the idler pulleys is arranged to yield transversely of its axis, thus: The pulley 66 is journaled on a bearing 68 penetrated by the flattened portion 69 of a stud 70, so as to shift transversely of the axis of the stud; it is normally held in such direction as to take up any slack in the chain 65 by the springs 71 housed therein and in the stud. When the slide 52 rises the pulley 66 is shifted against the tension of the springs, and when the slide falls, the springs return the pulley so as to take up the slack in the chain. By placing pulley 66 laterally of the path of travel of the cutter the yield of the pulley need be but very little, as will be obvious. The stud 70 may be secured in a slot 72 in the bracket 73 (supporting said stud and the pulley) so as to afford adjustment.

The cutter 55 reciprocates in such a plane that its cutting edge coöperates with the shoulder 36 of the tool 35 to shear off the mouth end of the shell as the latter is rotated by the tool; the cutting action is of course enhanced and the desired cleanness of cut insured by the fact that both shell and the cutter are rotated and that they come together in converging paths.

The shells to be trimmed are deposited by hand in two inclined chutes 74, attached to the standard 3, so that the open ends of the shells face rearwardly. They are delivered from these chutes to a transfer mechanism which in turn delivers them two at a time into pockets of the shell-carrier as each two pockets thereof move past. The transfer mechanisms include two rotary cylindrical blocks or wheels formed with pockets at their peripheries to receive the shells and these are alternately rotated and held at pause, picking off two shells (one each) from the chutes on each rotary advance and stopping long enough at each pause, with two pockets thereof (one each) facing (downwardly) the periphery of the shell carrier, to allow two pockets in the shell carrier to pass and pick off two shells previously deposited in the latter two pockets of the transfer blocks. The transfer mechanism may thus be described:

In standard 3 are journaled bushings 75 having their axes parallel with shaft 10 and arranged above the shell carrier. In each of these is splined a shaft 76 carrying one of the aforesaid pocketed blocks or wheels 77 at its forward end and a nut 78 at its rear end. Between the nut and the bushing is a spiral spring 79 which serves to hold a pinion 80, freely rotative on the shaft, compressed between the block and bushing, which are preferably faced at their adjoining ends with friction material, as leather 81. The pinion meshes with and is driven by a gear 82 formed on the carrier disk 41. On the rear end of the bushing is a ratchet 83 with which engages a pawl 84 pivoted on standard 3. The two pawls have pins 85 engaged in slots 86 in a link 87 to which is connected a lever 88 which is adapted to be actuated by tappets 89 on the turret section 12, these being spaced at such intervals that there is one tappet for each two pockets in the shell carrier. A spring 90 normally holds the lever bearing against the periphery of the turret section 12; springs 91 normally hold the pawl-pins 85 against the right-hand ends (Fig. 12) of the slots 86. 96 is an arc-shaped guard for each transfer block.

93 (Fig. 15) is a spring detent engageable with teeth 94 (Fig. 14) on the back of each ratchet to prevent backward rotation of the ratchets.

The pinions 80 of course rotate constantly, but the transfer blocks are allowed to make only partial turns, equal to the distance between any two pockets in each, intermittently, coming always to rest with a pocket of each facing the periphery of the shell carrier. They are held checked by the pawls while the lever 88 rides on the periphery of the turret section 12; but when a tappet passes and actuates the lever and so clears the pawls from the ratchet tooth of each engaged thereby, they make a rotary advance with the pinions, coming again to stop on engagement of the next tooth of each by its pawl. Assuming that two pockets in the shell carrier approach and pick off shells from two pockets in the (thus stationary) transfer blocks, the lever is next moved by a tappet to effect release of the transfer blocks and permit their consequent partial rotation to pick off two shells from the chutes, followed by the checking of such blocks with two of their recesses (one each) facing the shell-carrier and the shells in such pockets resting on the periphery of the shell carrier, ready to fall into the next two pockets thereof when they approach. Shells deposited in the transfer-blocks are retained therein, until they rest on the shell carrier, by the guards 92.

If one transfer block should jam in such position that the corresponding pawl would be blocked by a ratchet tooth from assuming the locking position, the slot appertaining to such pawl would permit the parts to function so that the other pawl might continue properly coöperating with its shell carrying block.

The operation, particularly described in the foregoing description of the means employed, will be readily understood. The shell being delivered from the supply chutes two at a time into pockets in the shell carrier are retained therein by the guard 47 until, successively, they are telescoped by the tools of the mandrels. By the latter they are rapidly rotated on their own axes, while traveling around with the carrier, and on each approaching the cutter the latter moves downward and shears off so much of the shell as is back of the shoulder 36 of tool 35, receding as soon as the shell has passed. Each mandrel remains forward until the shell thereon will remain supported, on its withdrawal, by the guard 48, whereupon it recedes, leaving the shell free to fall into the delivery chute 49 or be deflected thereinto by the deflector 50.

Starting and stopping of the machine are effected by the levers 95 which suitably control a clutch 96 on shaft 6.

When the machine is turned over by hand by wheel 9, if the rotation of the parts should be effected backward, the pawls 93 hold the transfer blocks against rotating so that the transfer operation does not occur.

Having thus fully described my invention, what I claim as new and desire to secure by Letters Patent is:—

1. In combination, a plurality of parallel mandrels each rotative on its own axis, means to advance the mandrels successively each laterally thereof, means to rotate the several mandrels on their own axes while advancing, a tool past which the mandrels advance movable transversely of the mandrels toward and from the work thereon, and means, gearing up the tool with the first-named means, to cause the tool successively to advance against and retreat from the work on the mandrels while they are laterally advanced.

2. In combination, a plurality of parallel mandrels each rotative on its own axis, means to advance the mandrels successively each laterally thereof in a continuous path, means to rotate the several mandrels on their own axes while advancing, a tool past which the mandrels advance movable transversely of the mandrels toward and from the work thereon, and means gearing up the tool with the first-named means, to cause the tool successively to advance against and retreat from the work on the mandrels while they are laterally advanced.

3. In combination, a plurality of parallel mandrels, means to advance the mandrels successively each laterally thereof, a rotary tool past which the mandrels advance movable transversely of the mandrels toward and from the work thereon, and means, gearing up the tool with the first-named means, to cause the tool successively to advance against and retreat from the work on the mandrels while they are laterally advanced.

4. In combination, a plurality of parallel mandrels, means to advance the mandrels successively each laterally thereof in a definite path, a tool past which the mandrels advance movable back and forth in a path converging toward the first-named path, and means to reciprocate the tool in its said path toward and from the mandrels while each is advancing.

5. In combination, a plurality of parallel mandrels each rotative on its own axis, means to advance the mandrels successively each laterally thereof in a definite path, means to rotate the mandrels while advancing, a tool past which the mandrels advance movable back and forth in a path converging toward the first-named path, and means to reciprocate the tool in its said path toward and from the mandrels while each is advancing.

6. In combination, a plurality of parallel mandrels each rotative on its own axis, means to advance the mandrels successively each laterally thereof in a definite path, a tool past which the mandrels advance movable back and forth in a path converging toward the first-named path and being rotative on an axis parallel with the mandrels, means to reciprocate the tool in its said path, and means to rotate the tool toward and from the mandrels while each is advancing.

7. In combination, a plurality of parallel mandrels each rotative on its own axis, means to advance the mandrels successively each laterally thereof in a definite path, a tool past which the mandrels advance movable back and forth in a path converging toward the first-named path and being rotative on an axis parallel with the mandrels, means to reciprocate the tool in its said path, and means to rotate both the tool and the mandrels toward and from the mandrels while each is advancing.

8. In combination, a plurality of mandrels, means to advance the mandrels successively each laterally thereof in a definite path, a tool past which the mandrels advance movable back and forth in a path forming a sharp convergence with the first-named path, and means to reciprocate the tool in its said path toward and from the mandrels while each is advancing.

9. In combination, a plurality of mandrels, means to advance the mandrels successively each laterally thereof in a definite path, means to rotate the mandrels while advancing, a tool past which the mandrels advance movable back and forth in a path forming a sharp convergence with the first-named path, and means to reciprocate the tool in its said path toward and from the mandrels while each is advancing.

10. In combination, a plurality of mandrels, means to advance the mandrels successively each laterally thereof in a definite path, a rotary tool past which the mandrels advance movable back and forth in a path forming a sharp convergence with the first-named path, means to rotate the tool and means to reciprocate the tool in its said path toward and from the mandrels while each is advancing.

11. In combination, a plurality of parallel mandrels each rotative on its own axis, a tool past which the mandrels advance rotative on an axis parallel with the mandrels, means to rotate said tool, and means to advance the mandrels successively against and past the rotating tool.

12. In combination, a plurality of parallel mandrels each rotative on its own axis, a tool past which the mandrels advance rotative on an axis parallel with the mandrels, means to rotate said tool and the mandrels, and means to advance the mandrels successively against and past the rotating tool.

13. In combination, a plurality of parallel mandrels each affording an axial support for an article to be telescoped thereon and rotated, a tool past which the mandrels advance rotative on an axis parallel with the mandrels, and means to rotate said tool, and means to advance the mandrels successively past and thereby bring the articles thereon successively against the rotating tool.

14. In combination, a plurality of parallel mandrels each affording an axial support for an article to be telescoped thereon and rotated, a tool past which the mandrels advance rotative on an axis parallel with the mandrels, and means to rotate said tool and the mandrels, and means to advance the mandrels successively past and thereby bring the articles thereon successively against the rotating tool.

15. In combination, a plurality of parallel mandrels each affording an axial support for an article to be telescoped thereon, means to advance the mandrels successively each laterally thereof in a definite path, a tool rotative on an axis parallel with the mandrels and movable back and forth toward and from said path, means to rotate said tool and means to reciprocate said tool into and out of contact with the successive articles while the mandrels are advancing them.

16. In combination, a plurality of parallel mandrels each affording an axial support for an article to be telescoped thereon and being rotative on its own axis, means to continuously advance the mandrels successively each laterally thereof in a definite path, a tool movable back and forth toward and from said path, means to rotate the mandrels, and means to reciprocate said tool into and out of contact with the successive articles while the mandrels are advancing them.

17. In combination, a plurality of parallel mandrels each affording an axial support for an article to be telescoped thereon and rotated, means to advance the mandrels successively each laterally thereof in a definite path, a tool movable back and forth toward and from said path, means to reciprocate the tool into and out of contact with the successive articles while the mandrels are advancing them and means to rotate the tool on an axis parallel with the mandrels.

18. In combination, an axial supporting member for an article to be telescoped thereon having a circumferential shearing shoulder in the portion thereof to be housed within the article, a shearing member formed with a working edge having a shearing contact with said shoulder of the first-named member, means to move one member toward the other to effect shearing, and means to rotate one member during shearing on an axis thereof at right angles to the shearing plane.

19. In combination, a mandrel affording an axial support for an article to be telescoped thereon and rotated and having a circumferential shearing shoulder in the portion thereof to be housed within the article, a shearing member formed with a working edge having a shearing contact with said shoulder of the first-named member, means to move one member toward and from the other to effect shearing and means to rotate the shearing member on an axis parallel with the mandrel.

20. In combination, an axial supporting member for an article to be telescoped thereon having a circumferential shearing shoulder in the portion thereof to be housed within the article, a shearing member formed with a working edge having a shearing contact with said shoulder of the first-named member and rotative on an axis parallel therewith, means to move one member toward the other to effect shearing, and means to rotate each member on its own axis during shearing.

21. In combination, a rotary planetary system including a supporting structure, a series of work-rotating devices arranged therein, and means to rotate said structure and each device continuously on its own axis, and a cutter into engagement with which each article is brought by said system.

22. In combination, a rotary planetary system including a supporting structure, a series of work-rotating devices arranged therein, and means to rotate said structure and each device continuously on its own axis, a cutter arranged and movable in a plane transverse of the axes of said devices, and means to move the cutter into and out of the path of the articles carried around by said system.

23. In combination, a rotary planetary system including a supporting structure, a series of work-rotating devices arranged therein, and means to rotate said structure and each device continuously on its own axis, a cutter arranged and movable in a plane transverse of the axes of said devices, and means, gearing up said cutter with said system, to move the cutter into and out of the path of the articles carried around by said system.

24. In combination, a rotary planetary system including a supporting structure, a series of work-rotating devices arranged therein, means to rotate said structure and each device continuously on its own axis, a rotary cutter arranged in a plane transverse of the axes of said devices, and means to rotate the cutter.

25. In combination, an advancing carrier to receive the article, a mandrel to hold the article in the carrier, means to shift the mandrel longitudinally thereof into and out of holding engagement with said article while being advanced with the carrier, and a tool operative on the article while engaged by the mandrel.

26. In combination, an advancing carrier to receive the article, a mandrel to telescope the article in the carrier, means to shift the mandrel longitudinally thereof into and out of telescoped relation to said article while being advanced with the carrier, and a tool operative on the article while telescoped by the mandrel.

27. In combination, an advancing carrier having a plurality of pockets to receive the articles arranged progressively of its path of advance, a plurality of mandrels to hold the articles in said pockets, means to shift each mandrel longitudinally thereof into and out of holding engagement with an article while being advanced with the carrier, and a tool successively operative on the articles while engaged by the mandrels.

28. In combination, an advancing carrier having a plurality of pockets to receive the articles arranged progressively of its path of advance, a plurality of mandrels to telescope the articles in said pockets, means to shift each mandrel longitudinally into and out of telescoped relation to an article while being advanced with the carrier, and a tool successively operative on the articles while telescoped by the mandrels.

29. In combination, an advancing carrier to receive the article, a mandrel to telescope the article in the carrier, means to shift the mandrel longitudinally thereof into and out of telescoped relation to said article while being advanced with the carrier, and a tool operative on the article laterally of the mandrel while telescoped by the mandrel.

30. In combination, a structure having a pocket to receive the article, a device movable thrustwise against the article in said pocket and coöperative with the latter to hold the article, said pocket having an outlet for the article in the thrust line of said device and a yielding stop to limit the movement of the article in response to the thrust of said device, and means to operate on the article while held against said stop by said device.

31. In combination, a carrier rotative on a substantially horizontal axis and having pockets to receive tubular articles open at its periphery and adapted to hold the articles parallel with said axis, means to operate on the articles while they are moving with the carrier, and a mandrel to telescope each article and retain the same in its pocket.

32. In combination, a carrier rotative on a substantially horizontal axis and having pockets to receive tubular articles open at its periphery and adapted to hold the articles parallel with said axis, means to operate on the articles while they are moving with the carrier, a mandrel arranged and shiftable back and forth parallel with said axis into and out of telescoped relation to each article to retain the same in its pocket, and means to cause successive back and forth shiftings of the mandrel.

33. In combination, means to convey tubular articles in succession with their axes parallel, means to rotate each article on its own axis while advancing, and a cutter rotative on an axis parallel with the axes of the articles and operative against the advancing articles in a plane transverse of their axes.

34. In combination, means to convey a tubular article transversely of its axis, a mandrel to telescope the article, means to cause the mandrel to telescope the article while advancing, and means operative laterally against the article when telescoped by the mandrel.

35. In combination, means to convey a tubular article transversely of its axis, a mandrel to telescope the article, means to cause the mandrel to telescope the article while advancing, means to rotate the mandrel while telescoping the article, and means operative laterally against the article when telescoped by the mandrel.

36. In combination, a rotary driven member shiftable transversely of its axis of rotation, a continuous flexible power transmission member, and means to drive and guide the latter member including another rotary member arranged laterally of but shiftable toward and from the path of the first-named member and spring-held from said path, said transmission member extending around the first and third named members.

37. In combination, a tool to operate on the article, a pocketed means to receive and carry the article into position to be engaged by the tool, a rotary device to enter the pocket and thereupon temporarily support the article, means to rotate said device, and means to cause said device to enter and withdraw from the pocket during the advance of said means.

38. In combination, an advancing carrier having side-by-side portions spaced laterally of the path of advance of the carrier, one having means to hold the article to be operated upon, a mandrel to support the article movable through the other portion toward and from the said means, and means to operate on the articles in a plane between said portions while supported by the mandrel.

39. In combination, an advancing carrier having side-by-side portions spaced laterally of the path of advance of the carrier, one having means to hold the article to be operated upon, a mandrel to telescope the article movable through the other portion toward and from the said means, and means to operate on the articles in a plane between said portions while supported by the mandrel.

In testimony whereof I affix my signature.

AMOS CALLESON.